Jan. 16, 1951  V. KLIMA  2,538,527
WINDING FOR ARMATURES OF COMMUTATOR MOTORS
Filed March 19, 1949  2 Sheets-Sheet 1
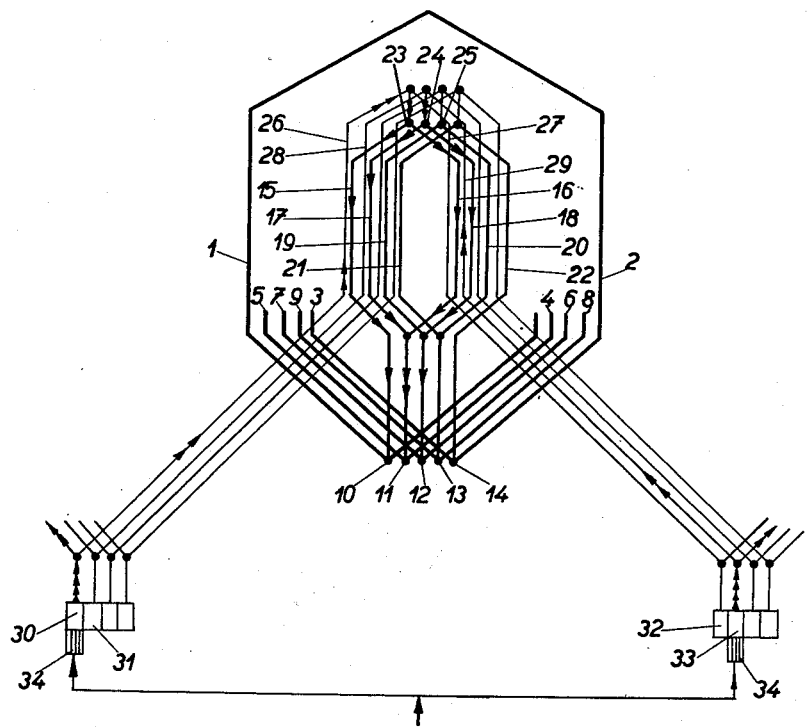
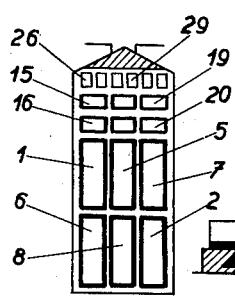
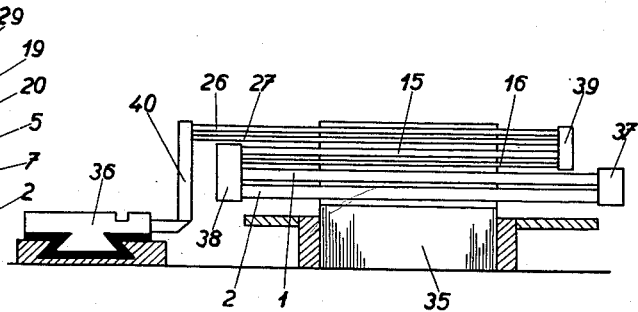
INVENTOR
Vilém Klima,
BY Jan. 16, 1951 V. KLIMA 2,538,527
WINDING FOR ARMATURES OF COMMUTATOR MOTORS
Filed March 19, 1949 2 Sheets-Sheet 2

INVENTOR
Vilém Klima,
BY

Patented Jan. 16, 1951

2,538,527

UNITED STATES PATENT OFFICE 2,538,527

WINDING FOR ARMATURES OF COMMUTATOR MOTORS

Vilém Klíma, Prague, Czechoslovakia, assignor of one-half to Moravian Electrical Engineering Works, National Corporation, Olomouc, Czechoslovakia Application March 19, 1949, Serial No. 82,312
In Czechoslovakia March 26, 1948

9 Claims. (Cl. 171—228)

This invention relates to commutator type dynamoelectric machines and, more particularly, to a novel armature winding and commutator connection for A. C. motors.

In A. C. commutating motors without auxiliary poles, a multiple parallel winding connected to the commutator is used to obtain larger outputs per pole.

It is also known to use an auxiliary winding, in addition to the multiple parallel winding, either in parallel or in series with the main winding, such auxiliary winding having a smaller number of parallel windings, also connected in parallel to the same segments.

The disadvantages of such windings is that, during rotation, all windings are not in the same position with respect to the brushes. While one winding is being directly fed by the brush lying on the segment to which the respective winding is connected, the other branches are fed through the auxiliary winding by a current which decreases in accordance with the distances of such other branches from the segment on which the brush is just resting. This uneven resistance of the individual branches causes pulsation of the current of the branches and sparking especially in machines having a larger output per pole.

In accordance with the present invention, this disadvantage is eliminated by using an additional auxiliary winding and a novel interconnection between the main winding, the auxiliary winding, and the commutation.

For an understanding of the invention, reference is made to the following description of typical embodiments thereof, as illustrated in the accompanying drawings.

In the drawing:

Fig. 1 is a developed view of a portion of a winding arrangement according to the invention.

Fig. 2 is a cross-sectional view through a slot carrying windings according to Fig. 1.

Fig. 3 is a partial longitudinal sectional view of the armature, taken through a slot.

Figure 4:
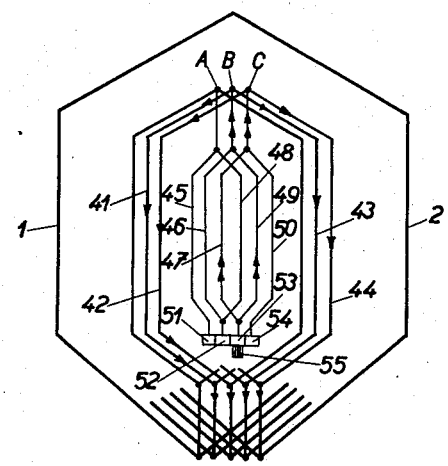
Figs. 4 and 5 are partial developments of modified winding arrangements according to the invention.

Fig. 1 shows a developed view of an armature winding according to the invention. 1, 2 ... 8 indicate the main winding of the armature, in the example a quadruplex one. Conductors 1, 2, 3 are parts of one system, 4, 5 of the second, 6, 7 of the third, 8, 9 of the fourth system. This winding is not connected directly to the commutator segments, but, at the heads 10, 11, 12, 13, 14, etc., it is connected to an auxiliary winding. In the illustrated example, the auxiliary winding is a lap winding 15, 16, 17, 18, 19, 20, 21, 22, etc., a further auxiliary winding 26, 27, 28, 29, etc., being connected to the rear heads of the said winding, 23, 24, 25, etc., on the opposite side of the armature from the commutator, this winding being shown as a wave winding (but it could also be a lap winding). At the opposite end of the armature, a commutator with segments 30, 31, 32, 33, etc., is connected to this latter auxiliary winding.

Referring to Fig. 2, main winding conductors 1, 2, 5, 6, 7 and 8 are arranged at the base of the slot, auxiliary winding conductors 15, 16, 20, etc., thereabove, and the second auxiliary winding conductors, such as 26, 29 nearest the mouth of the slot.

Fig. 3 shows a longitudinal section through the armature, illustrating the main winding conductors 1, 2 the first auxiliary winding conductors 15, 16, and the second auxiliary winding conductors 26, 27. The armature is indicated at 35, and 36 is the commutator. The main winding conductors are soldered to rings 37, 38 at each end, ring 38 also connecting the auxiliary winding conductors 15, 16 to the main winding. Ring 39 connects the first and second auxiliary windings, and the second auxiliary winding 26, 27 is connected to the commutator 36 by means of a lug 40.

The advantage of this arrangement, as compared with known arrangements, is the fact that the current 34 divides, through one auxiliary winding 26 and 29, into 2 coils of the second auxiliary winding 15, 16, 17, 18 which feed the main winding much more evenly, at the points 10, 11, 12. At one known arrangement one point, e. g. 10, is fed directly and the other points 11, 12, 13 are fed through the turns of the auxiliary winding, or, also through their impedance.

In the present invention, the magnetic influence of the current in the conductor 26 is cancelled by the influence of the current in the conductors 15 and 17, and the magnetic influence of the current in the conductor 29 cancels the influence of the currents 16 and 18, because the magnetic influences possess the same magnitude and have opposite directions. This reduces the inductance of the commutating conductors, and commutation is substantially improved.

Another advantage of the arrangement is the fact that the auxiliary winding may be made with a large resistance, and it acts as resistance rings.

If one auxiliary winding, or advantageously both, are wound as wave windings, they act, together with the main lap winding, as equalizing rings, so that the latter need not be especially provided.

A further alternative of the invention is the use of two auxiliary windings having a different number of parallel branches. Fig. 4 shows again a quadruplex main winding 1, 2 . . ., but the auxiliary winding connected to it, 41, 42, 43, 44, is a duplex, double-parallel winding. The second auxiliary winding 45, 46, 47, etc., or 48, 49, 50, etc., respectively is again connected to the rear heads of the first auxiliary winding 41, 42, 43, 44. This winding is, e. g., a simple parallel one, and, on the other side, it is again connected to the commutator 51, 52, 53, 54.

As indicated by the arrows, the current of the brush 55 divides completely uniformly between all 4 branches of the winding. This arrangement, also, has the advantage that the brush does not short-circuit the main winding, but only the auxiliary winding having a large resistance. This reduces considerably the equalizing currents caused by the transformation voltage. At the same time, very convenient damping is obtained when interrupting the main current, because the auxiliary winding is connected in parallel to the main winding and possesses a smaller time constant. It is advantageous to arrange the two auxiliary windings to possess different time constants. It is especially advantageous to arrange the winding as indicated in Fig. 2, i. e., to make the winding connected to the commutator to have greatest resistance and smallest leakage, or, to place it at the opening of the slot; to place the main winding at the bottom of the slot, and to give it smallest resistance, and to make the auxiliary winding which is connected to the main winding, to have values between those of the two mentioned windings.

Figure 5:
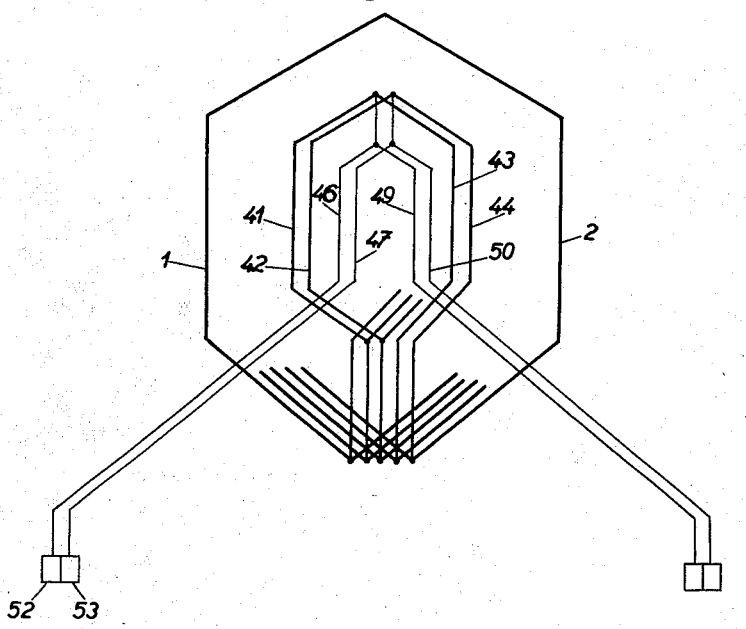

In Fig. 5 an alternative arrangement of the winding of Fig. 4 is shown, characterized by the fact that one auxiliary winding is a wave winding instead of a lap winding.

The main winding may also be wound as a combination of two windings, i. e., one lap winding and one wave winding, having the same number of branches, and it is also possible to omit half of the laps and waves.

It is advantageous if the main winding is a lap winding, and the first auxiliary winding is a wave winding, because it does not possess excessive protrusion of the heads and acts as an equalizer ring. The second auxiliary winding may be a lap winding.

I claim:

1. In an A. C. motor having an armature and a commutator at one end of said armature, the combination a multiplex, parallel conductor main winding; a first auxiliary parallel conductor winding; means connecting the conductor junctions at the commutator end of the main winding to the corresponding conductor junctions at the commutator end of the first auxiliary winding; and a second auxiliary winding having parallel conductors each connecting a conductor junction at the opposite end of the first auxiliary winding to a commutator segment; whereby said main winding is connected to the commutator segments only through both auxiliary windings and the magnetic influences of the currents in said auxiliary windings substantially counterbalance each other.

2. In an A. C. motor having an armature formed with longitudinally extending, circumferentially spaced winding slots and a commutator at one end of said armature, the combination of a multiplex, parallel conductor main winding; a first auxiliary parallel conductor winding; means connecting the conductor junctions at the commutator end of the first auxiliary winding; and a second auxiliary winding having parallel conductors each connecting a conductor junction at the opposite end of the first auxiliary winding to a commutator segment; whereby said main winding is connected to the commutator segments only through both auxiliary windings and the magnetic influences of the currents in said auxiliary windings substantially counterbalance each other; said main winding lying at the base of the slots, said first auxiliary winding overlying said main winding, and said second auxiliary winding overlying said first auxiliary winding.

3. A winding arrangement as claimed in claim 1 in which said first auxiliary winding has a smaller number of parallel current paths than said main winding.

4. A winding arrangement as claimed in claim 1 in which at least one winding is a wave winding and at least one winding is a lap winding.

5. A winding arrangement as claimed in claim 1 in which said main winding is a lap winding and said auxiliary windings are wave windings.

6. A winding arrangement as claimed in claim 1 in which all said windings are lap windings.

7. A winding arrangement as claimed in claim 1 in which said main and first auxiliary windings are lap windings and said second auxiliary winding is a wave winding.

8. A winding arrangement as claimed in claim 1 wherein the auxiliary windings have smaller time constants than the main winding.

9. A winding arrangement as claimed in claim 1 wherein said second auxiliary winding has a smaller time constant than said first auxiliary winding.

VILÉM KLÍMA.

REFERENCES CITED

The following references are of record in the file of this patent:

UNITED STATES PATENTS

| Number | Name | Date |
|---|---|---|
| 2,311,700 | Schwartz | Feb. 23, 1943 |